(12) United States Patent
Langenfeld et al.

(10) Patent No.: US 7,367,353 B1
(45) Date of Patent: May 6, 2008

(54) COMBINED CHECK VALVE AND PRESSURE RELIEF VALVE

(75) Inventors: Thomas J. Langenfeld, Sullivan, IL (US); Matthew C. Roney, Sullivan, IL (US); Robert E. Trimble, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 11/371,854

(22) Filed: Mar. 9, 2006

Related U.S. Application Data

(63) Continuation of application No. 10/435,365, filed on May 9, 2003, now Pat. No. 7,028,708.

(51) Int. Cl.
*F16K 17/18* (2006.01)

(52) U.S. Cl. ............................. 137/512.2; 137/512.3; 137/513.5; 137/540; 137/493.6; 251/284

(58) Field of Classification Search ................ 137/511, 137/512.2, 512.3, 540, 493.1–493.6; 251/284
See application file for complete search history.

(56) References Cited

U.S. PATENT DOCUMENTS

| | | | |
|---|---|---|---|
| 807,269 A | 12/1905 | Hildebrand | |
| 1,528,086 A * | 3/1925 | Scovel, Jr. | ................... 417/504 |
| 2,393,589 A | 1/1946 | Compton et al. | |
| 3,153,423 A | 10/1964 | Biello et al. | |
| 3,811,510 A * | 5/1974 | Rogers et al. | ............... 166/302 |
| 3,856,041 A | 12/1974 | Cryder et al. | |
| 4,016,903 A | 4/1977 | Akashi et al. | |
| 4,300,591 A | 11/1981 | Sutton | |
| 4,637,430 A | 1/1987 | Scheffel et al. | |
| 4,648,369 A | 3/1987 | Wannenwetsch | |
| 4,926,902 A | 5/1990 | Nakamura et al. | |
| 4,948,092 A | 8/1990 | Kasper et al. | |
| 5,002,088 A | 3/1991 | Engelhardt et al. | |
| 5,378,118 A | 1/1995 | Phillips | |
| 5,479,978 A | 1/1996 | Zenkich | |
| 5,546,752 A | 8/1996 | Horton et al. | |
| 5,632,467 A | 5/1997 | Just et al. | |
| 5,687,468 A | 11/1997 | Hans et al. | |
| 5,778,925 A | 7/1998 | Cooke | |
| 5,950,669 A | 9/1999 | Fehlmann et al. | |

(Continued)

*Primary Examiner*—Ramesh Krishnamurthy
(74) *Attorney, Agent, or Firm*—Neal, Gerber & Eisenberg LLP

(57) ABSTRACT

A combination check valve and pressure relief valve is provided for use in regulating the flow of fluid between a first fluid side and a second fluid side. The valve may include a valve body, a valve insert positioned within an aperture of the valve body, a check poppet attached to the valve insert, and a check spring positioned between the valve insert and the valve body. In addition, a relief spring and a relief poppet may be positioned within a cavity formed by the valve insert and secured in position by the check poppet. The combination of the valve insert and the check poppet is adapted to move relative to the valve body and against the force of the check spring to permit fluid to pass from the first fluid side to the second fluid side, and the relief poppet is adapted to move relative to the check poppet against the force of the relief spring to allow fluid to pass from the second fluid side to the first fluid side.

16 Claims, 13 Drawing Sheets

U.S. PATENT DOCUMENTS

| | | |
|---|---|---|
| 6,045,116 A | 4/2000 | Wilke et al. |
| 6,073,444 A | 6/2000 | Horton et al. |
| 6,691,512 B1 | 2/2004 | Trimble |
| 6,719,005 B1 | 4/2004 | Trimble et al. |
| 6,935,454 B1 | 8/2005 | Hauser et al. |
| 6,968,684 B1 | 11/2005 | Hauser et al. |

* cited by examiner

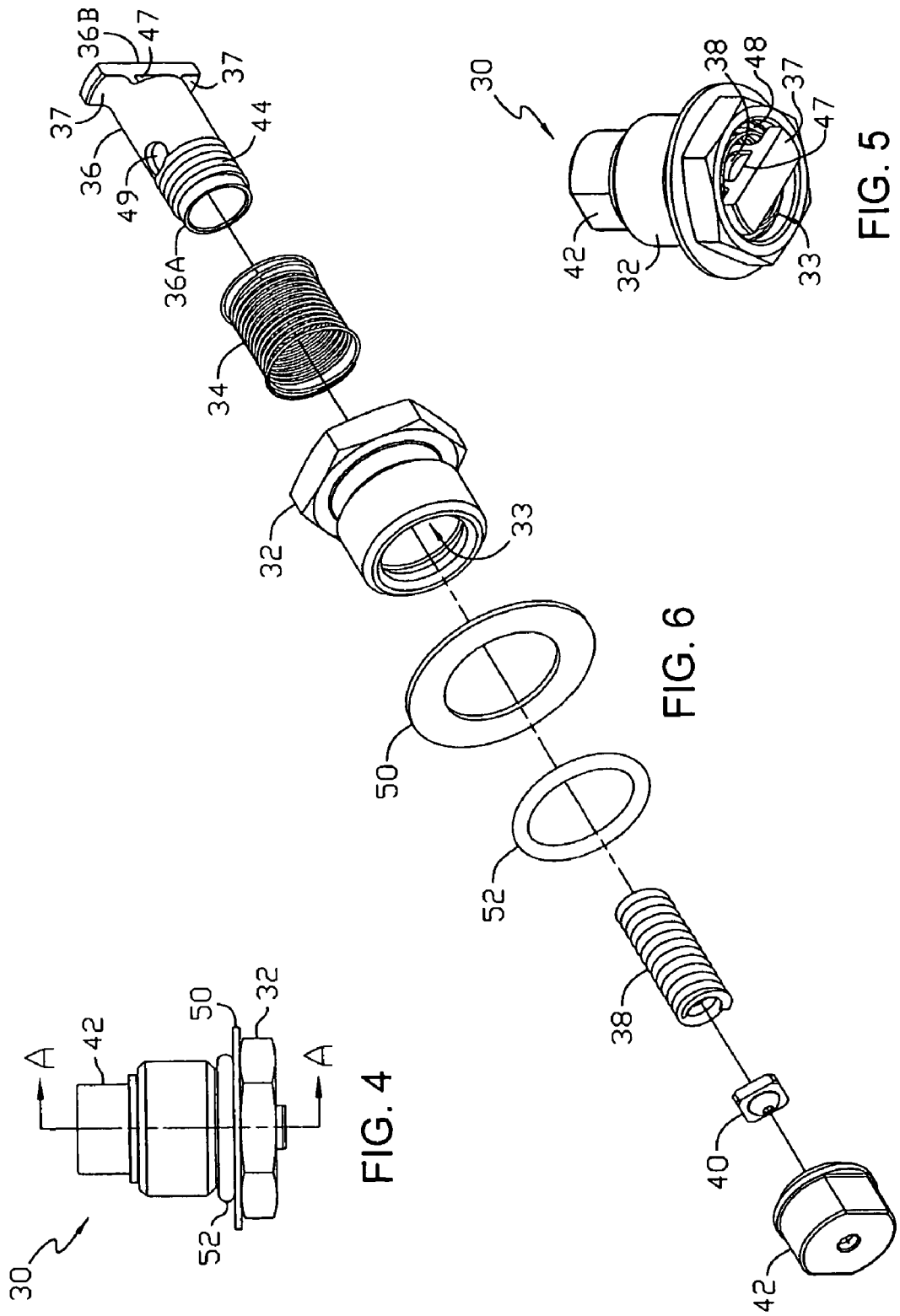

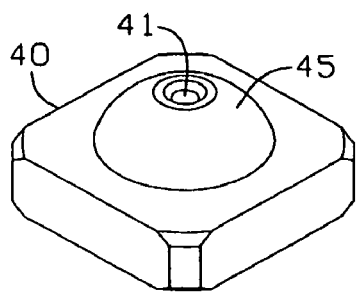
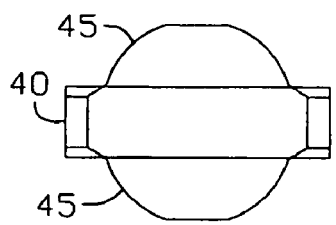
FIG. 12     FIG. 13
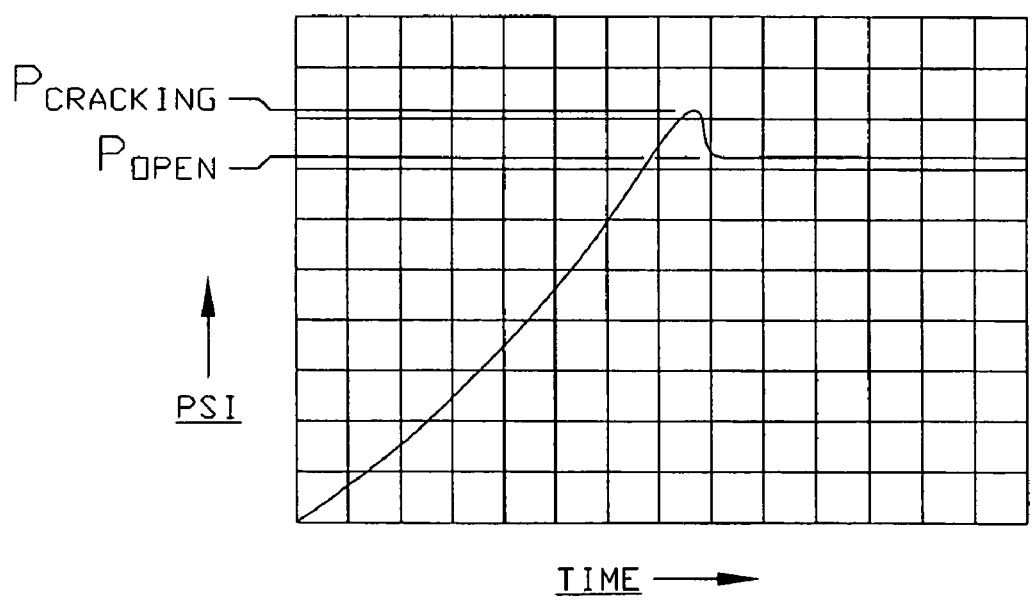
FIG. 14

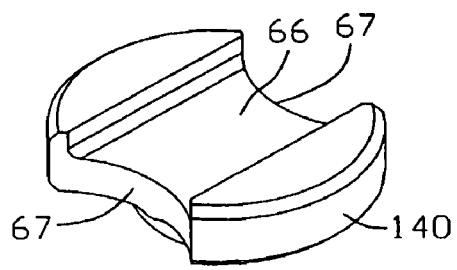
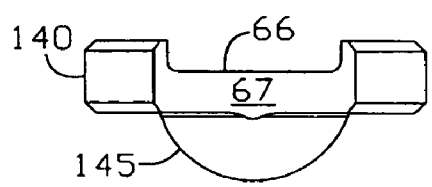
FIG. 15      FIG. 16
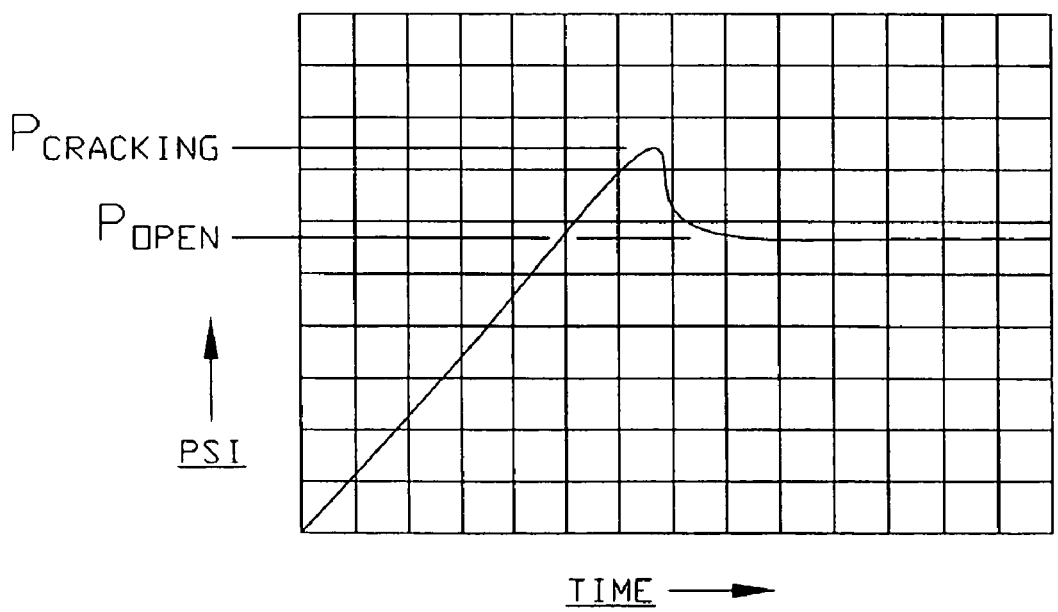
FIG. 17

COMBINED CHECK VALVE AND PRESSURE RELIEF VALVE

CROSS-REFERENCE

This application is a continuation of U.S. application Ser. No. 10/435,365 filed on May 9, 2003 now U.S. Pat. No. 7,028,708. This prior application is incorporated herein in its entirety by reference.

BACKGROUND OF THE INVENTION

This invention relates generally to the design of valves and more particularly, to the design of a combination check valve and pressure relief valve.

DESCRIPTION OF THE PRIOR ART

Check valves and pressure relief valves are known in the art. Generally, a check valve acts to restrict flow in one direction, while a relief valve is used to regulate pressure. U.S. Pat. No. 4,948,092 discloses a combined check valve and pressure relief valve having a resilient duckbill valve body that is manually operated. Fluid passing through a cylindrical core around a valve actuator functions to open the lips of the duckbill valve body to permit the free flow of the fluid while back pressure functions to seal the lips of the duckbill valve. Manual depression of the valve actuator, however, causes the valve actuator to penetrate and open the valve lips to selectively permit backflow to provide the relief valve function. It is also known to provide check valve and pressure relief functions that are activated by the pressure of the hydraulic fluid.

Although these valves are capable of achieving their intended purpose, valves actuated by fluid pressure must be set during assembly to the desired activation pressure or flow rate. For example, in some prior art valves, this procedure is performed by subjecting the valve to pressure and then manually adjusting the setting. In other prior art valves, the valve is adjusted by measuring a compression force on the valve spring and then locking the valve insert once the desired activation pressure or flow is established. These setting procedures are time consuming and add to the cost of installation for valves.

SUMMARY OF THE INVENTION

To overcome these, and other disadvantages, a combination check valve and pressure relief valve is provided for use in regulating the flow of fluid between a first fluid side and a second fluid side. The valve may include a valve body, a valve insert positioned within an aperture of the valve body, a check poppet attached to the valve insert, and a check spring positioned between the valve insert and the valve body. In addition, a relief spring and a relief poppet may be positioned within a cavity formed by the valve insert and secured in position by the check poppet. The combination of the valve insert and the check poppet is adapted to move relative to the valve body and against the force of the check spring to permit fluid to pass from the first fluid side to the second fluid side, and the relief poppet is adapted to move relative to the check poppet against the force of the relief spring to allow fluid to pass from the second fluid side to the first fluid side.

A better understanding of these and other advantages, objects, features, properties and relationships of the invention will be obtained from the following detailed description and accompanying drawings, which set forth illustrative embodiments and which are indicative of the various ways in which the principles of the invention may be employed. Other benefits and objects of this invention are disclosed herein and will be obvious to readers of ordinary skill in the art. It should be appreciated by those with skill in the art, however, that the disclosed embodiments may be used in a wide variety of applications where both a check valve and relief valve function is required.

BRIEF DESCRIPTION OF THE DRAWINGS

For a better understanding of the invention, reference may be had to the following drawings in which:

FIG. 4 depicts a side view of a first embodiment of a combination check valve and pressure relief valve;

FIG. 5 depicts a perspective view of the valve shown in FIG. 4;

FIG. 6 depicts an exploded perspective view of the valve shown in FIG. 4;

FIG. 12 depicts a perspective view of a first embodiment of a relief poppet;

FIG. 13 depicts a side view of the relief poppet shown in FIG. 12;

FIG. 14 is a graph illustrating the performance characteristic of a valve incorporating the first embodiment of the relief poppet shown in FIG. 12;

FIG. 15 depicts a perspective view of a second embodiment of a relief poppet;

FIG. 16 depicts a side view of the relief poppet shown in FIG. 15;

FIG. 17 is a graph illustrating the performance characteristic of a valve incorporating the second embodiment of the relief poppet shown in FIG. 15;

DETAILED DESCRIPTION

Figure 1:
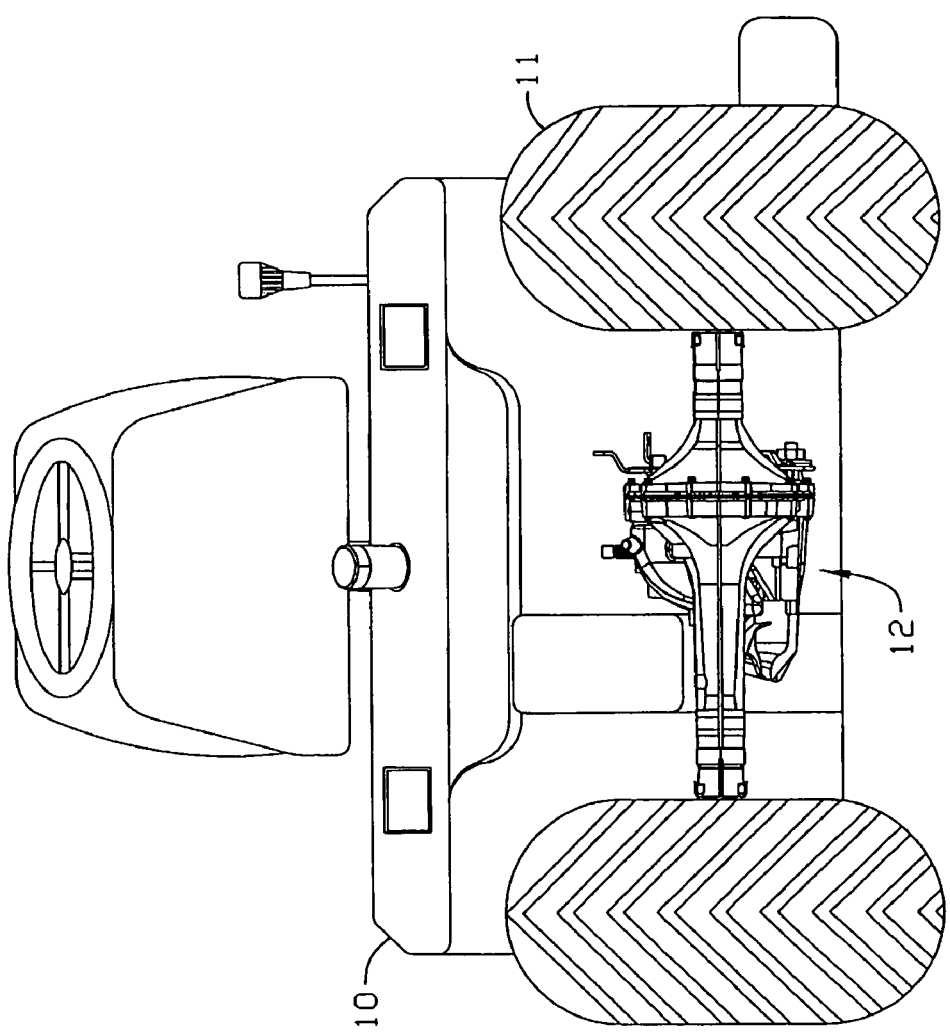
FIG. 1 depicts a rear elevational view of a vehicle including a transaxle incorporating the present invention.

Turning now to the figures, wherein like reference numerals refer to like elements, there is generally illustrated in FIGS. 4 to 11 a combination check valve and pressure relief valve ("valve") 30. In addition, throughout the following description several embodiments of the valve 30 or other elements may be described. Any reference to elements that are described in more than one embodiment will be given the same number that the element was given in the first embodiment with an additional prefix numeral, except for the first embodiment which will not receive a prefix numeral. While valve 30 will be described in the context of a hydrostatic transmission, it should be understood by those of ordinary skill that valve 30 may also be utilized in connection with a myriad of additional applications. In addition, the valve 30 shown herein may be easily assembled into a cartridge configuration and requires no special tools or procedures to adjust/set the pressure relief setting.

Figure 2:
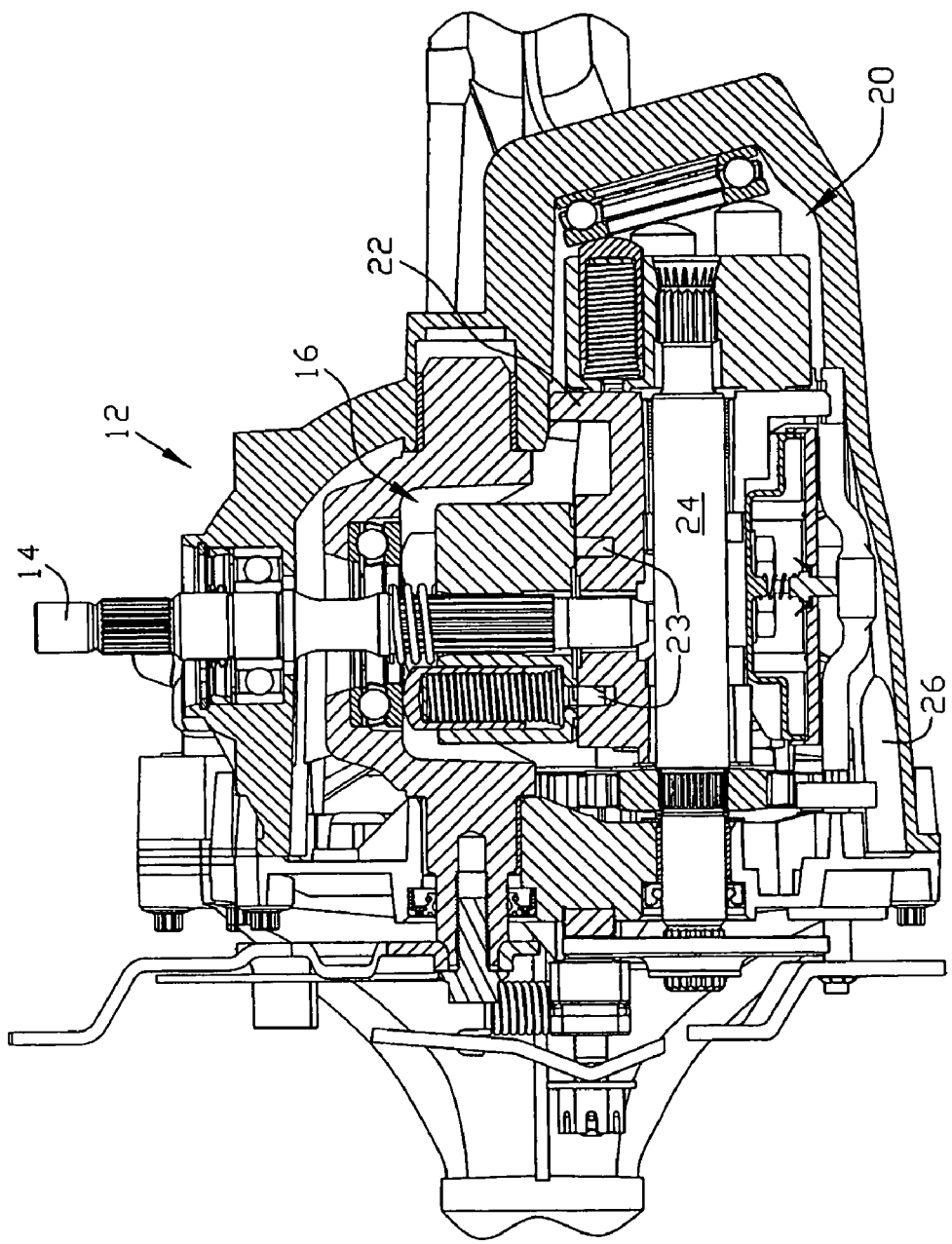
FIG. 2 depicts a cross-sectional, front view of the transmission shown in FIG. 1.
Figure 3:
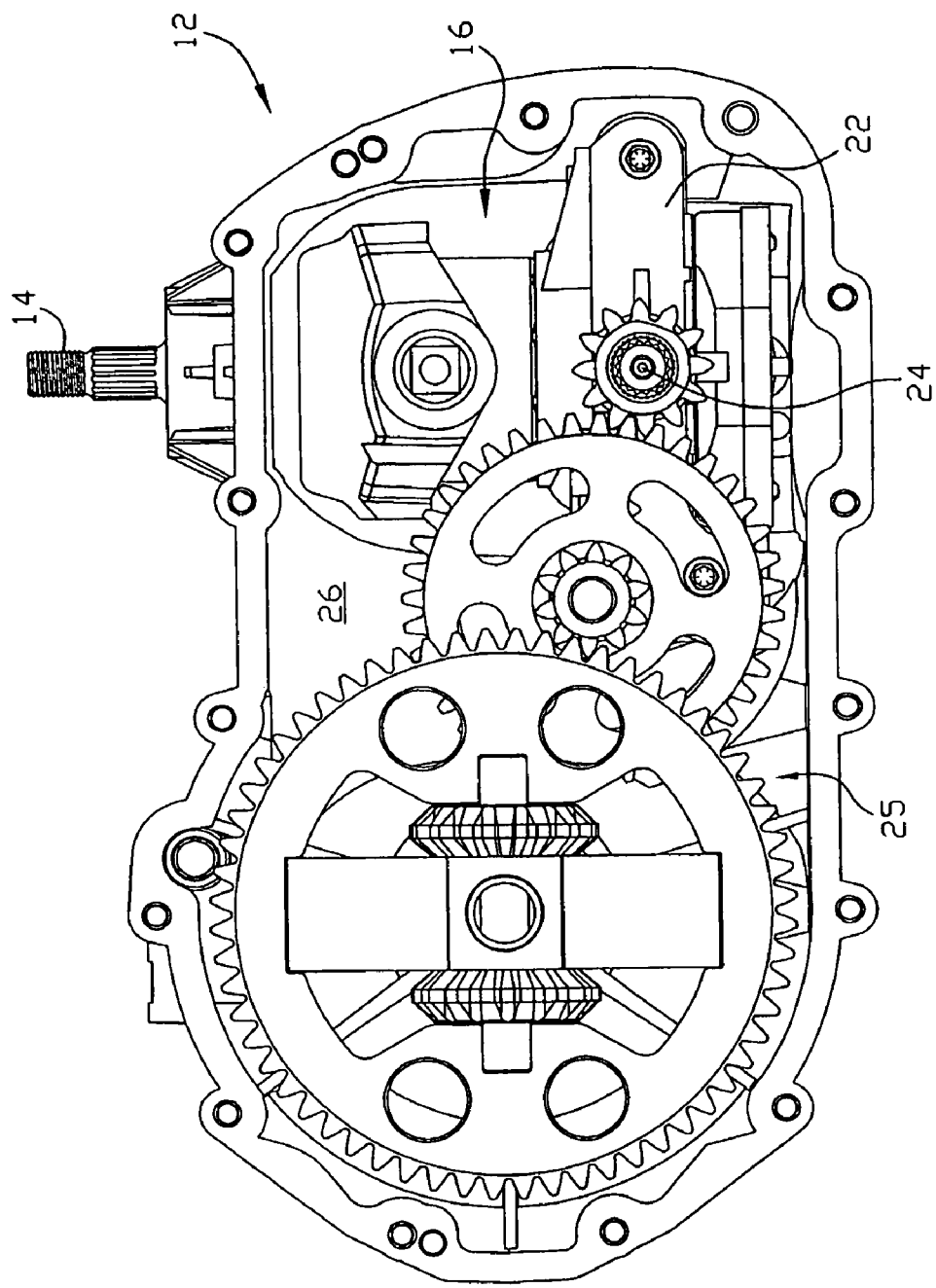
FIG. 3 depicts a side view of the transaxle shown in FIG. 1 with certain portions, including the side housing, removed for clarity.

FIG. 1 shows a typical vehicle 10 in which a hydrostatic transaxle 12 is mounted. FIG. 2 shows a cross-sectional view of the hydraulic components of transaxle 12. Generally, such devices operate on the principal of an input shaft 14 driving a hydraulic pump 16. As pump 16 rotates it displaces fluid through porting 23 located in a center section 22 to drive a motor 20, all of which are located within a generally fluid filled sump 26. As shown in FIG. 3, motor 20 is also associated with a shaft 24 that is capable of driving a gear train 25, which may further drive wheels 11 of a vehicle 10. Although this description describes a hydrostatic transaxle containing an axial piston pump and axial piston motor, it should be appreciated that the disclosed embodiments may also be used in conjunction with a variety of hydraulic devices such as stand-alone hydraulic pumps or motors that may be of other configurations, such as radial piston, gerotor, and the like. For a more detailed description of the principles of operation of a hydrostatic transmission, the reader is referred to U.S. Pat. Nos. 5,201,692, and 6,322,474, which are incorporated herein by reference in their entirety.

As noted above and as shown in FIG. 11, for placing hydraulic pump 16 in fluid communication with hydraulic motor 20, center section 22 includes hydraulic porting 23. Hydraulic porting 23 is in further fluid communication with a source of makeup fluid, such as a fluid sump 26 or a charge gallery. Generally, the hydraulic porting comprises a high pressure side through which fluid moves from hydraulic pump 16 to hydraulic motor 20 and a low pressure side through which fluid returns from hydraulic motor 20 to hydraulic pump 16. Since fluid tends to leak from various components, hydraulic pump 16 generally requires more fluid than is returned from hydraulic motor 20 via the low pressure side porting. This requirement for fluid may be satisfied by using valve 30. Generally, valve 30 functions to prevent the flow of fluid from hydraulic porting 23 to the source of makeup fluid, while also allowing fluid to flow from the source of makeup fluid into hydraulic porting 23 when the fluid pressure in the hydraulic porting is lower relative to the fluid pressure in the source of makeup fluid. In cases where the fluid pressure in hydraulic porting 23 is excessive, determined on an application by application basis, valve 30 further functions to relieve this excess fluid pressure by allowing fluid to be discharged from hydraulic porting 23 to the source of makeup fluid.

Figure 11:
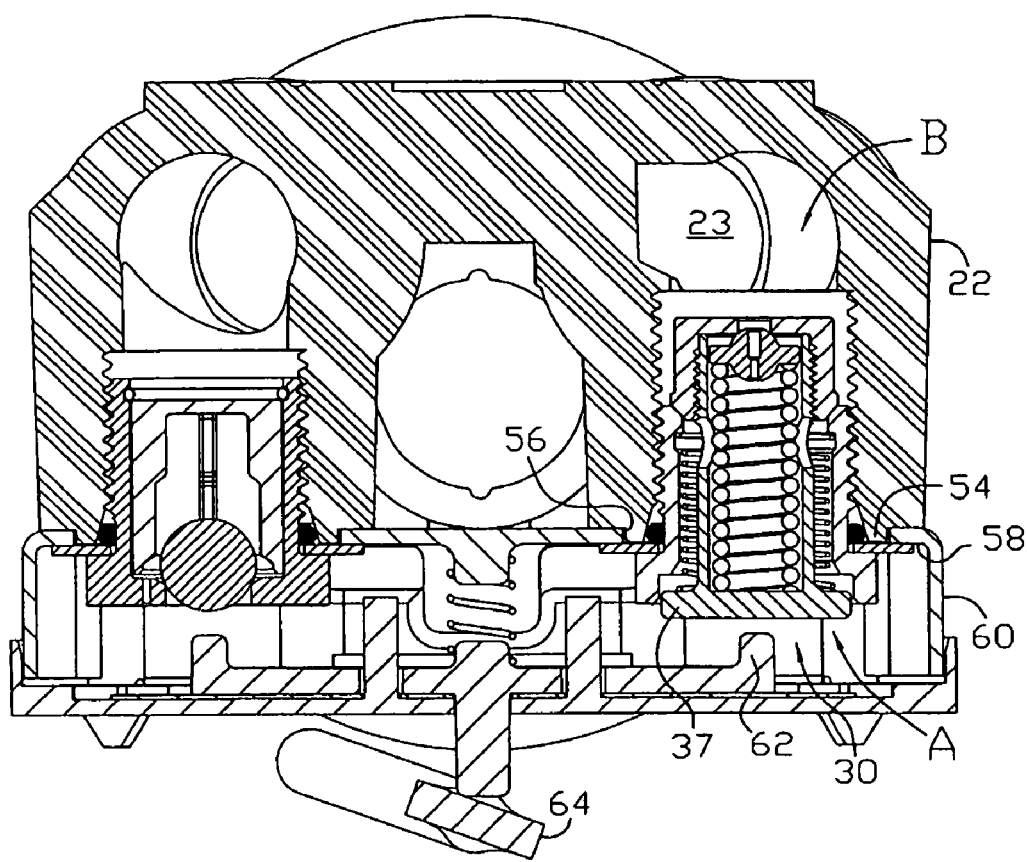
FIG. 11 depicts a sectional view of a center section for a single pump hydrostatic transmission in which the valve shown in FIGS. 4 through 10 is installed.

To this end, valve 30 may be mounted in center section 22 between a first fluid side A and second fluid side B. In the application described herein, the first fluid side A is associated with the source of makeup fluid while the second fluid side B is associated with the porting that provides a fluid path between hydraulic pump 16 and hydraulic motor 20. By way of example, FIG. 11 illustrates valve 30 installed in an exemplary center section 22 for a hydrostatic transmission carried as part of an integrated hydrostatic transaxle. It should be appreciated by those with skill in the art, however, that the illustrated embodiments is not intended to be limiting and that valve 30 may be used in connection with other applications.

The preferred embodiment of the present invention utilizes screw threads to attach valve 30 to center section 22. Other means for securing valve 30 to center section 22 are known in the art.

To allow for the flow of fluid from fluid side A to fluid side B when fluid side B is under lower pressure relative to fluid side A, valve 30 is comprised of a valve body 32 having an aperture 33, a valve insert 36 that is slidably positioned within aperture 33 and a check poppet 42. More specifically, valve insert 36 has a first end 36A and a second end 36B, the first end 36A of valve insert 36 being positioned within and extending through aperture 33 and the second end 36B of valve insert forming a valve stop 37. Check poppet 42 is attached to the first end 36A of valve insert 36 and the combination of valve insert 36 and check poppet 42 form a unitary valve 30, while maintaining the slidable relationship with valve body 32. The valve stop 37 may form various shapes and sizes, however, the length of the valve stop 37, which shall be defined as the greatest horizontal dimension of the valve stop 37, must exceed the diameter of the aperture 33. It should also be understood that the valve stop 37 may exist as an integral portion of valve insert 36 or as a separate and distinct portion capable of being removably attached to valve insert 36.

For creating a biasing relationship between valve body 32 and the combination of valve insert 36 and check poppet 42, valve 30 may include a check spring 34 as illustrated in FIGS. 4 to 11. Check spring 34 is optional in the embodiments described herein, but in some situations, such as inverted orientation, check spring 34 may improve the operating characteristics of a transaxle. Furthermore, as will be obvious to one skilled in the art, fluid flow through the valve is simplified and improved when check spring 34 is removed; in this situation the alternative fluid paths through valve insert 36 from sump 26 to porting 23 described below are unnecessary and may be eliminated.

Optional check spring 34 is positioned between valve insert 36 and valve body 32. More specifically, check spring 34 is placed within aperture 33 of valve body 32 and rests against lip 35, which is formed on an internal portion of valve body 32. The other end of check spring 34 rests on valve stop 37.

For connecting first end 36A of valve insert 36 to check poppet 42, the first end 36A of valve insert 36 extends through aperture 33 of valve body 32 and includes screw threads 44. As shown in FIGS. 7 to 11, the screw threads are capable of removably connecting valve insert 36 to check poppet 42. The combination of valve insert 36 and check poppet 42 allows the slidable relationship with valve body 32 to be assumed. Although the preferred embodiment of the present invention includes a threaded relationship between valve insert 36 and check poppet 42, it should be understood that other means for removably connecting valve insert 36 to check poppet 42 may also be used, such as retaining rings, a snap fit, etc.

Figure 9:
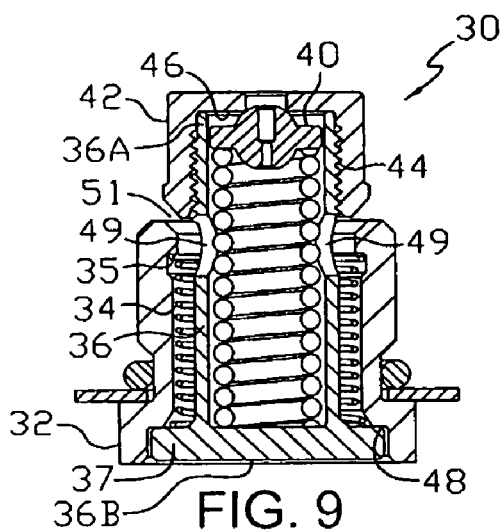
FIG. 9 depicts a sectional view of the valve shown in FIG. 4 with the check poppet in the open position.

When the force on check poppet 42, caused by the fluid pressure from fluid side A being greater than the fluid pressure on fluid side B (the "check pressure differential"), is sufficient to overcome the restoring force of the check spring 34, the check pressure differential will influence the movement of check poppet 42 away from valve body 32 until valve stop 37 contacts step 48 of valve body 32, thereby compressing check spring 34 into valve body 32. As shown in FIG. 9, this movement creates a gap 51 between valve body 32 and check poppet 42. In this manner, the movement of check poppet 42 away from valve body 32 breaks a sealing engagement between check poppet 42 and valve body 32, thereby allowing the fluid under pressure in fluid side A to flow into fluid side B. As shown in FIG. 9, hydraulic fluid flows from sump 26 (not shown), through the space between valve insert 36 and valve body 32 where spring 34 is located, and then through gap 51 into porting 23 (not shown). Hydraulic fluid may optionally flow through openings 47 and into the central hollow portion of valve insert 36. The hydraulic fluid may then flow out through openings 49 and into gap 51. Fluid should be able to flow readily through either the space between valve body 32 and valve insert 36 or through the route formed in valve insert 36 by opening 47 and opening 49, or through both routes, to provide a minimal pressure drop for fluid entering porting 23 under the anticipated environmental and performance conditions for valve 30 to function properly.

Figure 7:
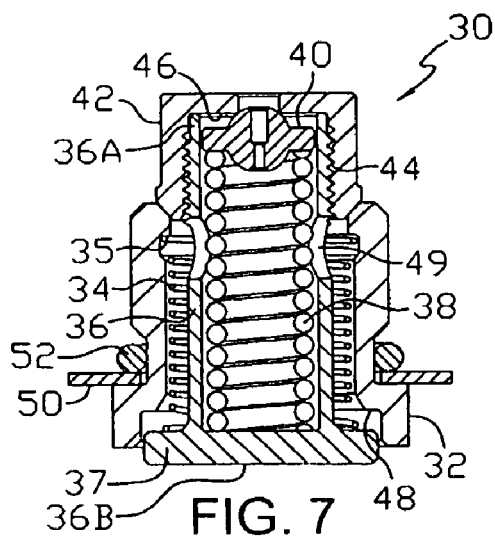
FIG. 7 depicts a sectional view of the valve shown in FIG. 4 along lines A-A with the check poppet and relief poppet portions in the closed position.
Figure 8:
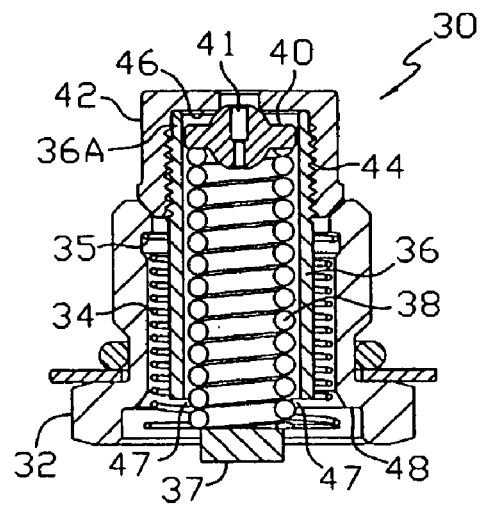
FIG. 8 depicts an orthogonal, sectional view of the valve shown in FIG. 7.

Once the check pressure differential and flow of fluid from fluid side A is no longer sufficient to overcome the restoring force of check spring 34, the return force provided by check spring 34 urges valve insert 36 away from valve body 32, which directs check poppet 42 back towards valve body 32. As shown in FIGS. 7 and 8, movement of check poppet 42 back towards valve body 32 functions to return check poppet 42 into sealing engagement with valve body 32, thereby preventing the flow of fluid between porting 23 and sump 26 through gap 51. In a valve configuration where the opening of the valve is oriented downwards, or towards the ground, the force of gravity is usually sufficient to move check poppet 42 toward valve body 32. In other orientations, building system pressure will also force check poppet 42 toward valve body 32; however, use of optional check spring 34 may provide improved smoothness of transition from when the check poppet 42 is in the unseated or open position to the seated or closed position, thus, minimizing a possible jerk as system pressure builds rapidly once the check poppet is restored to the seated position.

Figure 10:
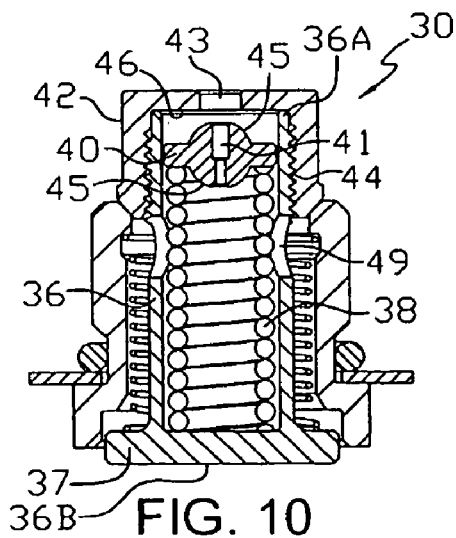
FIG. 10 depicts a sectional view of the valve shown in FIG. 4 with the relief poppet portion in the open position.

To allow for the flow of fluid from fluid side B to fluid side A when the fluid in fluid side B is at a predetermined pressure relative to the fluid in fluid side A, relief poppet 40 may be moved from a sealed position (as shown in FIGS. 7 and 8) to an open position (as shown in FIG. 10). When relief poppet 40 is in the open position, fluid will flow from porting 23 through opening 43 of check poppet 42, around the periphery of relief poppet 40 and through the central portion of valve insert 36. Then, fluid will flow out of passage 49 past valve insert 36 and into sump 26, or out passage 47 past the open areas of valve stop 37 into sump 26. Therefore, when the fluid pressure from fluid side B is greater than the force on fluid side A (the "relief pressure differential") and the force resulting from the relief pressure differential is sufficient to overcome the restoring force of relief spring 38, fluid may flow from fluid side B to fluid side A. At least one of the passages 47, 49 or an equivalent is required for the relief valve function to be effective.

When the relief pressure differential is no longer sufficient to overcome the restoring force of relief spring 38, relief spring 38 forces the relief poppet 40 back towards opening 43 in check poppet 42. As shown in FIGS. 7 and 8, movement of relief poppet 40 back towards check poppet 42 functions to return relief poppet 40 into sealing engagement with check poppet 42 to thereby restrict the flow of fluid from porting 23 around relief poppet 40 to sump 26.

For establishing the pressure relief setting for the valve 30, check poppet 42 is tightened on screw threads 44 until a torque level is achieved that indicates valve insert 36 has contacted inside surface 46 of check poppet 42, thereby compressing relief spring 38 and establishing the pressure at which the relief portion of valve 30 will open. Further, when check poppet 42 is secured to valve insert 36, all components of valve 30 are secured such that valve 30 becomes a complete assembly with a pre-established pressure relief setting.

Since the relief pressure is set by the physical configuration of valve 30 components, no steps are required to set the check or relief springs 34, 38 to a particular spring compression during assembly or installation of valve 30. Therefore, cost of assembly for the described valve 30 is also reduced. Rather, the desired fluid flow at a desired opening pressure is a function of the spring constants, physical dimensions, and amount of compression of check spring 34 and relief spring 38, which may be calculated in a manner well known to those of skill in the art.

To reduce the aggressiveness of the efficient hydraulics during vehicle acceleration and deceleration, an optional bleed passage 41 is incorporated into relief poppet 40. The bleed passage 41 provides a flow path for the hydraulic fluid from porting 23 through valve insert 36 and to sump 26. For providing a fluid seal when relief poppet 40 is in a closed position, the preferred embodiment of the present invention includes a relief poppet 40 with a substantially spherical surface 45. While the spherical surface is preferred for engaging the periphery of passage 43, it should be understood that many other shapes for relief poppet 40 may be employed to accomplish similar functionality. Relief poppet 40 may also include a spherical surface on each side so that relief poppet 40 may be properly installed regardless of which side cooperates with opening 43. It should be appreciated, however, that both sides of the relief poppet 40 are not required to be the same shape.

For sealing valve 30 against raised boss 54, which extends from center section 22 through a hole 56 located in filter wall 58 of filter 60 (as shown in FIG. 11), valve 30 may include a washer 50 and o-ring 52. Washer 50 aids in properly locating valve 30 and properly compressing o-ring 52 for sealing. Details of the configuration assumed by washer 50 and o-ring 52 shown in FIG. 6 are disclosed in U.S. Pat. No. 6,122,996, incorporated by reference herein in its entirety. It should be emphasized that while washer 50 functions to assist in the retention of filter 60, it is not a required element of the valve. Furthermore, o-ring 52 may also be eliminated in certain operational circumstances where the sealing and pre-load benefits of o-ring 52 are not desired or required.

As shown in FIG. 11, valve 30 may also be associated with additional components, such as a bypass mechanism. While it is commonly known in the art to provide a bypass mechanism, such as that shown in U.S. Pat. No. 6,122,996 referenced above, in order for the bypass mechanism to be effective, check poppet 42 or similar element of valve 30 must be moveable, thereby allowing fluid to flow between fluid side A and fluid side B when the bypass is actuated. To actuate the bypass mechanism in the preferred embodiment of valve 30, a portion of valve insert 36 is configured to allow bypass actuator 62 to contact it and move it when bypass rod 64 is actuated. When bypass rod 64 is actuated, it contacts valve stop 37, thereby causing valve insert 36 to slide within valve body 32, thereby lifting check poppet 42 from its sealing engagement with valve body 32, which will allow fluid to flow between porting 23 and sump 26.

As mentioned above, it should be understood by those with skill in the art that many different relief poppet 40 designs may be employed. It should also be understood that the performance of valve 30 may vary as a result of the relief poppet 40 design that is incorporated, as exemplified by the following embodiments of relief poppet 40 and the corresponding performance curves described below.

A first embodiment relief poppet 40 is shown in FIGS. 12 and 13. This embodiment is called a "squaucer" because of the combination of a generally square outer periphery and spherical, flying saucer-like, upper and lower surfaces. An approximate performance curve for this embodiment is provided in FIG. 14.

A second embodiment relief poppet 140 is shown in FIGS. 15 and 16. This embodiment has replaced the spherical surface of the previous embodiment that interfaces with relief spring 38 with a slot 66 and cutout portions 67. This configuration is shown without an optional bleed passage, and has the approximate performance characteristic shown in FIG. 17.

Figure 18:
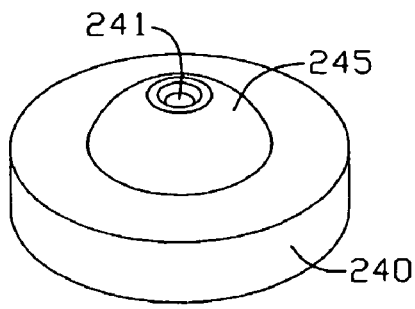
FIG. 18 depicts a perspective view of a third embodiment of a relief poppet.
Figure 19:
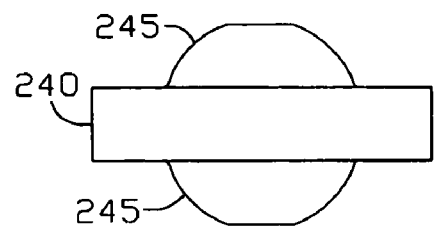
FIG. 19 depicts a side view of the relief poppet shown in FIG. 18.
Figure 20:
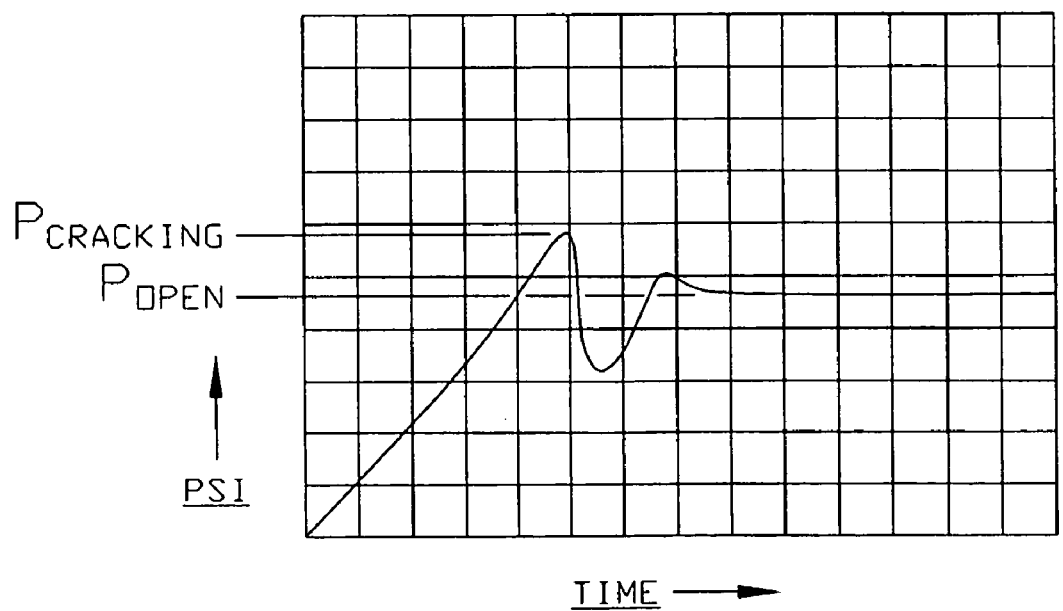
FIG. 20 is a graph illustrating the performance characteristic of a valve incorporating the third embodiment of the relief poppet shown in FIG. 18.

A third embodiment relief poppet 240 is shown in FIGS. 18 and 19. This embodiment has a generally circular outer periphery and has an overall shape described as "flying saucer." The approximate performance curve for this embodiment is provided in FIG. 20.

Figure 23:
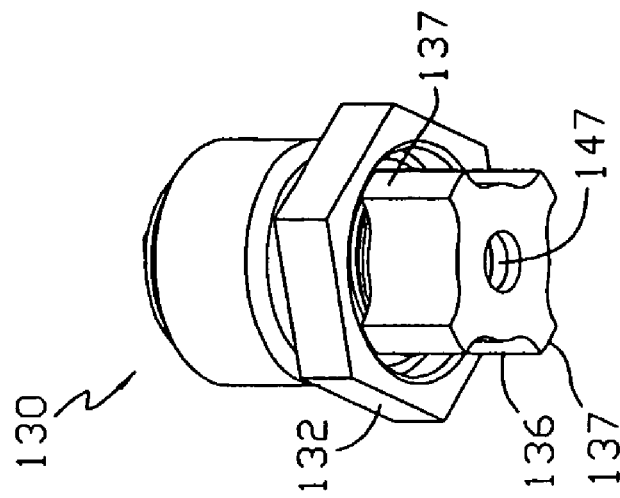
FIG. 23 depicts a perspective view of the valve shown in FIG. 21.
Figure 22:
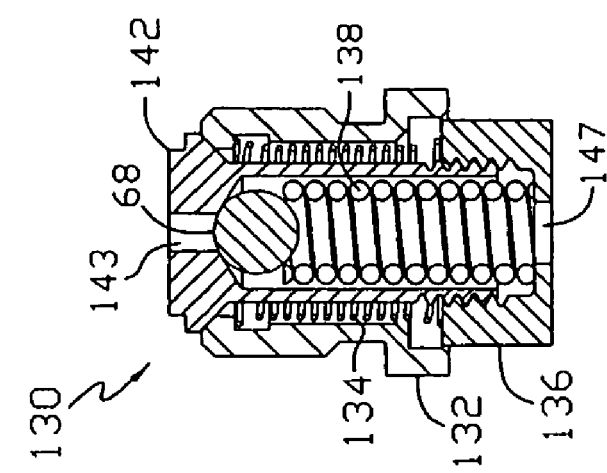
FIG. 22 depicts a sectional view of the valve shown in FIG. 21 along the lines B-B.
Figure 21:
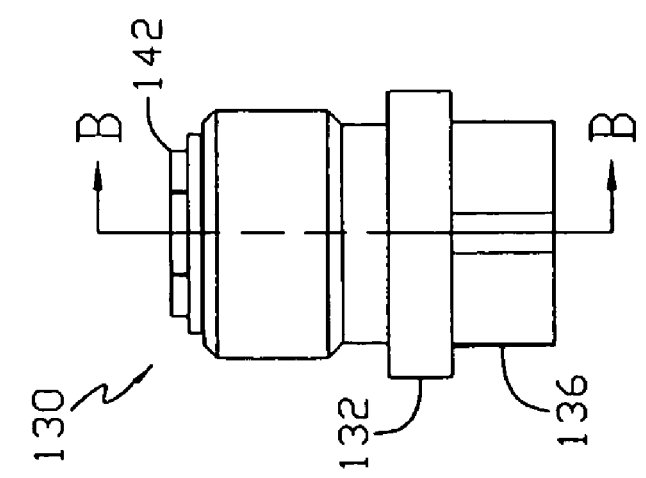
FIG. 21 depicts a side view of a second embodiment of a combination check valve and pressure relief valve.
Figure 26:
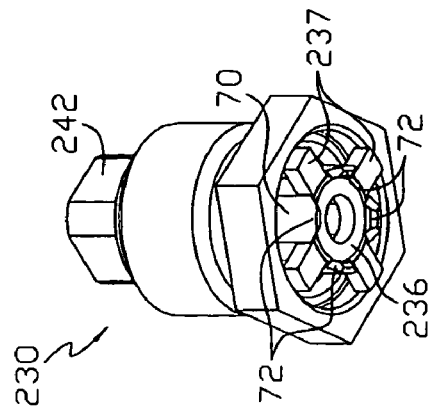
FIG. 26 is a perspective view of the valve shown in FIG. 24.
Figure 25:
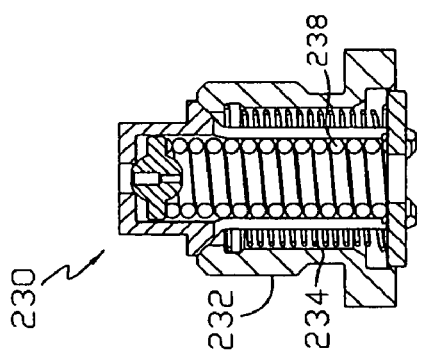
FIG. 25 depicts a sectional view of the valve shown in FIG. 24 along the lines C-C.
Figure 27:
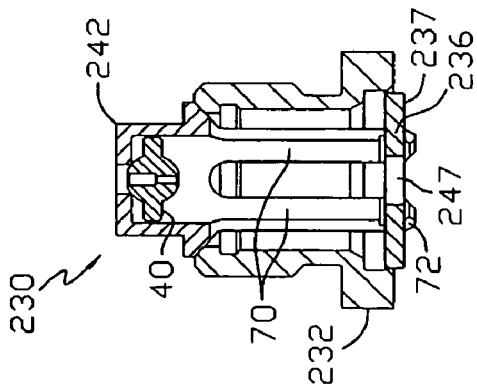
FIG. 27 depicts a sectional view of the valve shown in FIG. 24 with the internal springs removed.
Figure 24:
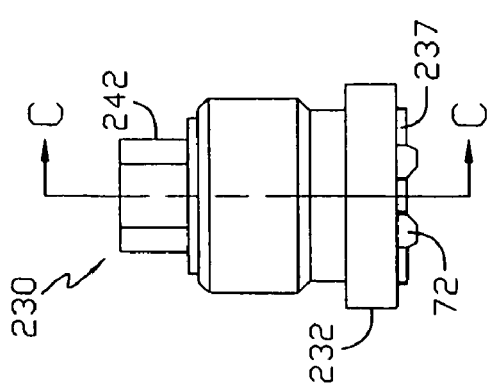
FIG. 24 depicts a side view of a third embodiment of a combination check valve and relief valve.
Figure 30:
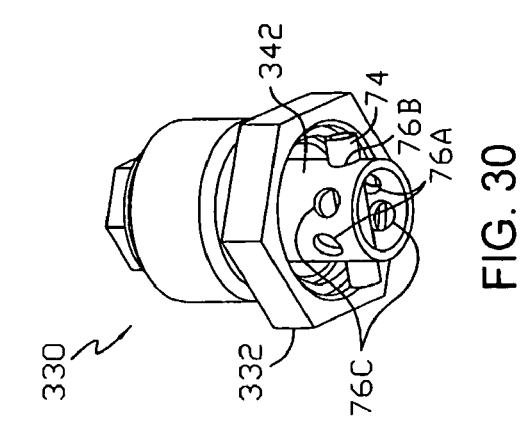
FIG. 30 depicts a perspective view of the valve shown in FIG. 28.
Figure 29:
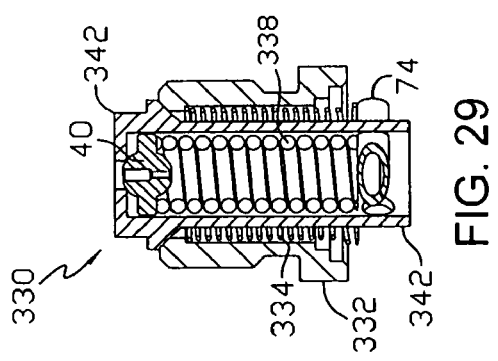
FIG. 29 depicts a sectional view of the valve shown in FIG. 28 along the lines D-D.
Figure 31:
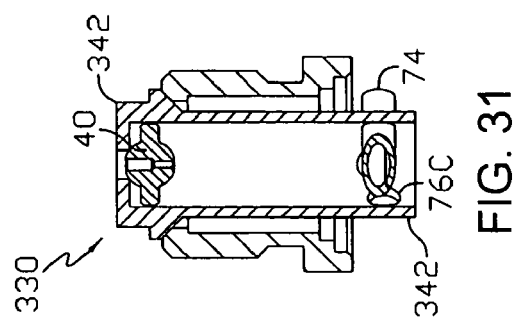
FIG. 31 depicts a sectional of the valve shown in FIG. 28 with the internal springs removed.
Figure 28:
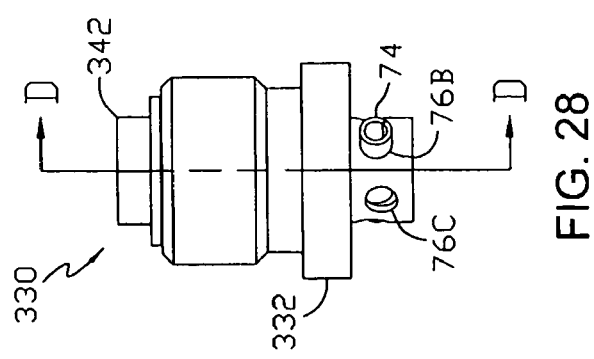
FIG. 28 depicts a side view of a fourth embodiment of a combination check valve and relief valve.

A second embodiment of the valve, i.e., valve 130, is shown in FIGS. 21, 22, and 23. Check poppet 142 extends through valve body 132, and valve insert 136 is attached to check poppet 142 by means of threads formed on check poppet 142 to retain the internal elements of valve 130. Ball 68 serves in place of relief poppet 40. Passage 147 is provided in valve insert 136 to allow pressure relieved fluid to escape to sump 26. Valve insert 136 also includes valve stops 137, which are spaced about the periphery of valve insert 136, to limit the movement of the central portion of valve 130. In addition, similar to the fluid flow created in the first embodiment of the valve, when conditions cause valve 130 to operate as a check valve, gaps adjacent to valve stops 137 provide space through which fluid may enter valve 130 and porting 23.

A third embodiment of the valve, i.e., valve 230, is shown in FIGS. 24 to 27. Check poppet 242 in this embodiment comprises legs 70, each of which have a locking feature 72 used to capture valve insert 236. The space between legs 70 and passage 247 allows fluid to freely flow to or from porting 23 depending on whether check poppet 242 or relief poppet 40 opens, respectively. Valve insert 236 also includes valve stops 237, which are spaced about the periphery of valve insert 236, to limit the movement of the central portion of valve 230.

A fourth embodiment of the valve, i.e., valve 330, is shown in FIGS. 28 through 31. Pin 74 inserted through a pair of holes 76A, 76B, or 76C act to constrain the internal components of valve 330. In this embodiment, each pair of holes 76A, 76B, or 76C are located at varying distances from the top portion of the check poppet 342. To vary the amount of compression that relief spring 338 exerts, therefore, pin 74 may be inserted into holes which are closer or farther from the top portion of check poppet 342. The placement of pin 74 with respect to the top portion of check poppet 342 may also cause the gap between check poppet 342 and valve body 332 to vary, which would affect fluid flow between sump 26 and porting 23. It should also be understood that pin 74 may be used as a valve stop in this embodiment and others.

Figure 34:
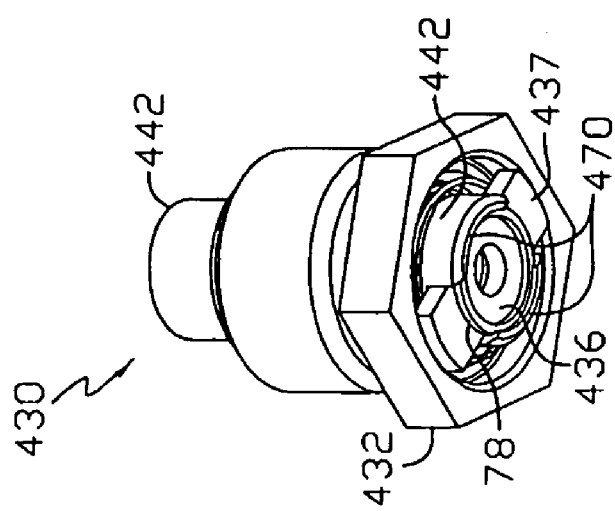
FIG. 34 depicts a perspective view of the valve shown in FIG. 32.
Figure 33:
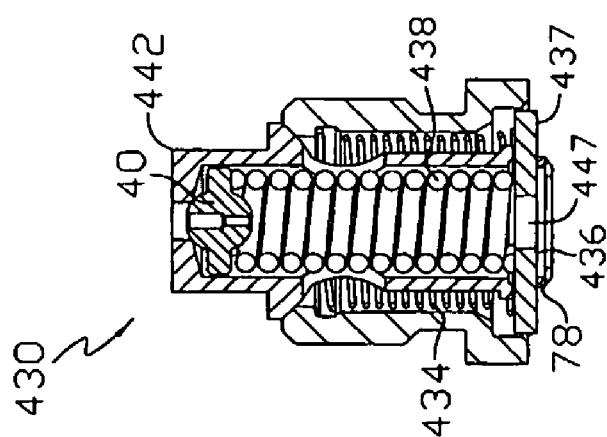
FIG. 33 depicts a sectional view of the valve shown in FIG. 32 along the lines E-E.
Figure 32:
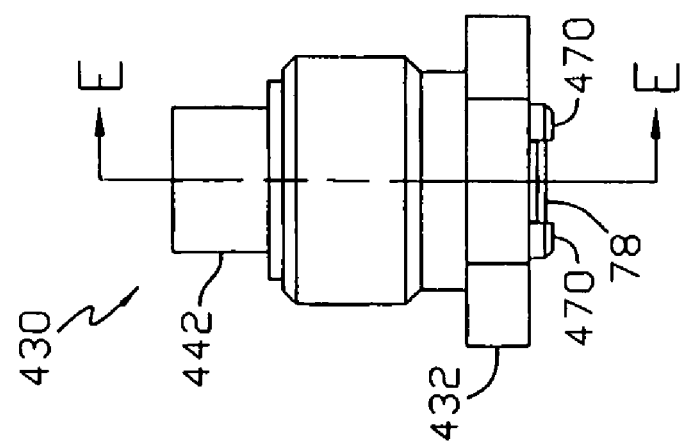
FIG. 32 depicts a side view of a fifth embodiment of a combination check valve and relief valve.

A fifth embodiment of the valve, i.e., valve 430, is shown in FIGS. 32 through 34. Check poppet 442 has legs 470, which extend past valve insert 436 and which cooperate with retaining ring 78. For retaining valve insert 436 and the other internal components of valve 430, valve insert 436 is positioned between an undercut formed in check poppet 442 and retaining ring 78. Further, retaining ring 78 is positioned between valve insert 436 and legs 470, and legs 470 are removably attached to retaining ring 78. Therefore, valve insert 436 is locked between check poppet 442 and retaining ring 78. Retaining ring 78 is located within an undercut formed in legs 470 of check poppet 442. The portion of valve insert 426 that extends outside of retaining ring 78 acts as a valve stop 437.

While specific embodiments of the invention have been described in detail, it will be appreciated by those skilled in the art that various modifications and alternatives to those details could be developed in light of the overall teachings of the disclosure. For example, while valve 30 is illustrated as being positioned in one side of a hydraulic circuit, it will be appreciate that such a valve 30 can also be positioned in the opposite side of a hydraulic circuit. Further, it may be desirable to include such valves on both sides of a hydraulic circuit. In addition, it should be appreciated by those with skill in the art that each of the different embodiments of the valve described herein may include valve inserts having one or more valve stops and that the valve stops may form integral or separate portions of the respective valve insert. Moreover, each of the various valve stop designs discussed above may be used in connection with different valve designs as desired. Accordingly, the particular arrangement disclosed is meant to be illustrative only and not limiting as to the scope of the invention which is to be given the full breadth of the appended claims and any equivalents thereof.

What is claimed is:

1. A valve for use in regulating the flow of fluid between a first fluid side and a second fluid side in a hydraulic circuit, comprising:
   a valve body comprising:
      a first end;
      a second end; and an aperture extending from the first end to the second end, the aperture having a first diameter;

a valve insert having a second diameter, which is less than the first diameter, the valve insert extending into the aperture, the valve insert having a valve stop with a length greater than the first diameter of the aperture, the valve stop positioned proximate to the first end of the valve body wherein a fluid flow space is created between the first diameter and the second diameter; and a check poppet, at least a portion of which has a third diameter greater than the first diameter, the check poppet attached to the valve insert proximate to the second end of the valve body;

wherein fluid passes through the fluid flow space as it flows from the first fluid side to the second fluid side of the hydraulic circuit.

2. The valve as set forth in claim 1, wherein the valve insert comprises an internal volume.

3. The valve as set forth in claim 2, further comprising a relief spring and a relief poppet positioned in the internal volume, wherein the relief spring biases the relief poppet to engage an opening formed in the check poppet.

4. The valve as set forth in claim 3, wherein the relief poppet moves away from the check poppet opening when the fluid pressure in the first fluid side exceeds the pressure in the second fluid side by a pre-determined amount.

5. The valve as set forth in claim 4, wherein the relief poppet and the check poppet form a fluid passage from the first fluid side to the second fluid side when the relief poppet is moved away from the opening in the check poppet.

6. The valve as set forth in claim 1, wherein a spring is positioned between the valve insert stop and a portion of the valve body located in the valve body aperture.

7. A valve for use in regulating the flow of fluid between a first fluid side and a second fluid side in a hydraulic circuit, comprising:

a generally cylindrical body comprising an aperture extending from a first end of the generally cylindrical body to a second end of the generally cylindrical body;

a first valve component extending into the aperture from the first end of the generally cylindrical body;

a second valve component attached to the first valve component proximate to the second end of the generally cylindrical body;

wherein attachment of the first valve component to the second valve component forms a volume with a plurality of openings and prevents the first valve component from being removed from the aperture, but permits the first and second valve components to move axially with respect to the generally cylindrical body; and wherein a relief poppet and a relief spring are located in the volume, and the relief poppet is biased against one of the plurality of openings by the force of the relief spring.

8. The valve as set forth in claim 7, wherein the first valve component comprises a check poppet and a valve insert and the second valve component comprises a valve stop.

9. The valve as set forth in claim 7, wherein the first valve component comprises a valve insert and a valve stop and the second valve component comprises a check poppet.

10. The valve as set forth in claim 7, further comprising a check spring positioned between the first valve component and the valve body.

11. The valve as set forth in claim 7, further comprising a check spring positioned between the second valve component and the valve body.

12. A unitary valve mechanism for use in connection with a separate member including a hydraulic circuit having a first fluid side and a second fluid side, the unitary valve mechanism comprising:

a valve body comprising a first end with a first opening, a second end with a second opening and an aperture extending from the first opening to the second opening, wherein the aperture has a first diameter; and a valve insert assembly extending through the aperture and axially slidable with respect to the valve body, the valve insert assembly comprising a relief poppet, a relief spring, an insert body having a second diameter and a valve stop at a proximal end of the insert body, the valve stop engaging a first surface on the valve body adjacent the first opening to limit axial movement of the valve insert assembly with respect to the valve body in one direction, and a check poppet at a distal end of the insert body, the check poppet engaging a second surface on the valve body adjacent the second opening to limit axial movement of the valve insert assembly with respect to the body in a second direction, opposite the first direction, wherein at least one of the first surface or the second surface on the valve body is positioned between the valve stop and the check poppet;

wherein a fluid flow space is created between the first diameter and the second diameter, and wherein fluid passes through the fluid flow space as it flows from the first fluid side to the second fluid side of the hydraulic circuit; and wherein the relief poppet is biased by the relief spring against an opening formed in the check poppet.

13. The unitary valve mechanism as set forth in claim 12, further comprising a check spring positioned between the valve body and the valve insert assembly.

14. The unitary valve mechanism as set forth in claim 13, wherein the insert body is selectively engaged to the check poppet.

15. The unitary valve mechanism as set forth in claim 14, wherein the valve stop is integrally formed on the insert body.

16. The unitary valve mechanism as set forth in claim 13, wherein the insert body is integrally formed on the check poppet and selectively engaged to the valve stop.

* * * * *